Figure 1:
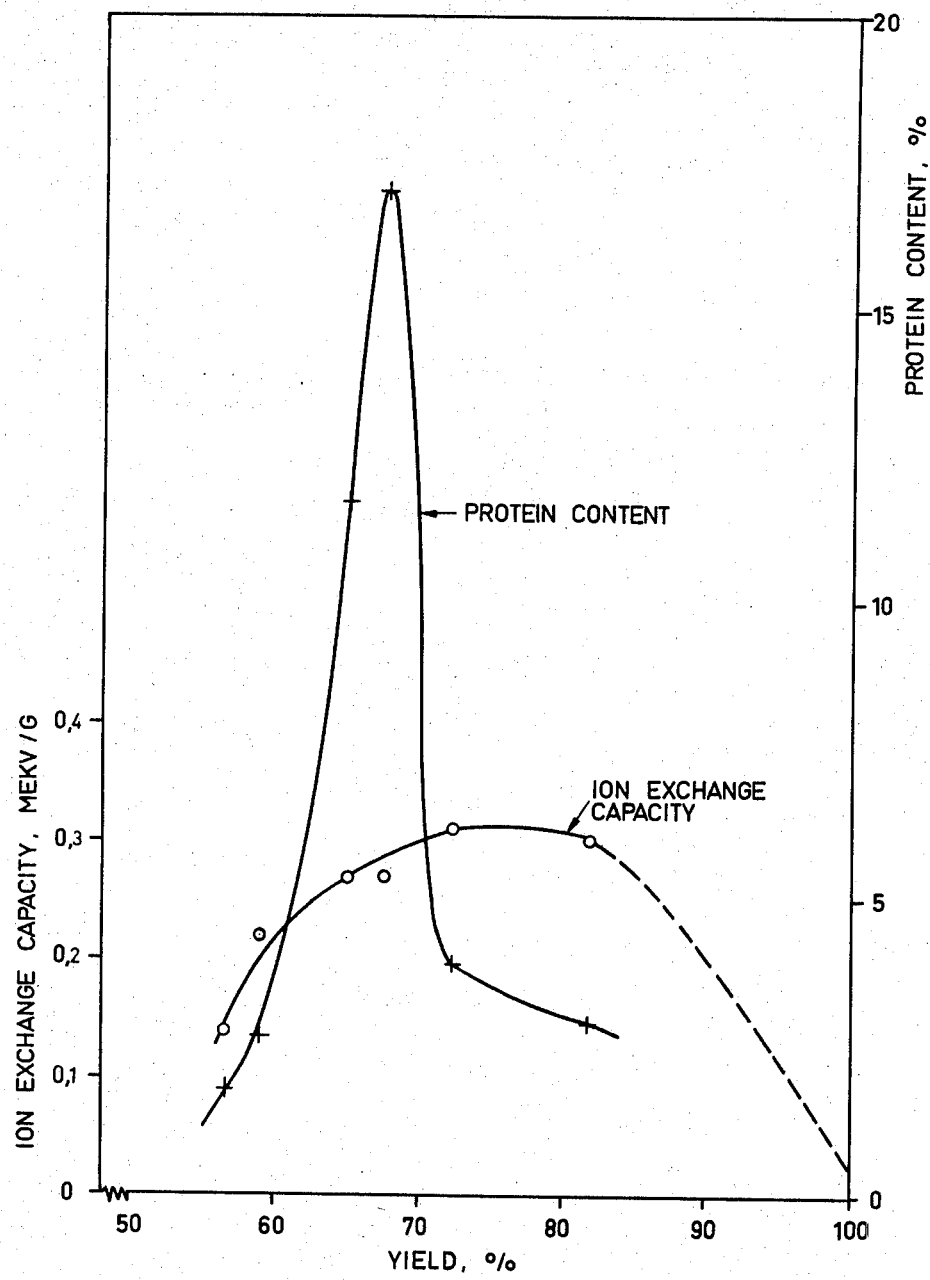

United States Patent [19]
Wennerblom et al.

[11] 3,862,901
[45] Jan. 28, 1975

[54] METHOD OF RECOVERING ORGANIC MATERIAL FROM AQUEOUS SOLUTIONS THEREOF

[75] Inventors: Bengt Axel Wennerblom, Sundsvall, Sweden; Sven Erik Jørgensen, Copenhagen, Denmark

[73] Assignee: Svenska Cellulosa Aktiebolaget, Sundsvall, Sweden

[22] Filed: Nov. 18, 1971

[21] Appl. No.: 200,159

[30] Foreign Application Priority Data
Dec. 2, 1970  Sweden............................ 16275/70

[52] U.S. Cl..................... 210/28, 210/38, 210/39, 195/116, 260/124 R
[51] Int. Cl............................. C02b 1/50, C02c 5/02
[58] Field of Search ...... 162/82; 210/24, 36, 38–40, 210/502, 54, 31 C, 28, 59; 252/179, 427; 195/116, 122; 260/112 R, 124 R

[56] References Cited
UNITED STATES PATENTS

| | | | |
|---|---|---|---|
| 1,107,175 | 8/1914 | Meunier............................ | 210/40 X |
| 2,172,301 | 9/1939 | Sutterlin et al.................... | 210/38 X |
| 2,681,846 | 6/1954 | Guthrie et al..................... | 210/502 X |
| 3,366,577 | 1/1968 | Miglietta............................ | 252/427 |
| 3,622,510 | 11/1971 | Felicetta et al. ................ | 260/124 R |
| 3,697,419 | 10/1972 | Grant................................ | 260/112 R |
| 3,759,826 | 9/1973 | Felicetta et al................. | 260/112 R |

FOREIGN PATENTS OR APPLICATIONS 492,032  9/1938  Great Britain........................ 210/38

OTHER PUBLICATIONS

Guthrie, John D., "Ion Exchange Cottons," Ind. & Eng. Chem., Vol. 44, No. 9, September 1952, pp. 2187–2189.

*Primary Examiner*—Thomas G. Wyse
*Attorney, Agent, or Firm*—Pierce, Scheffler & Parker

[57] ABSTRACT

The invention comprises a method of isolating at least some of the high molecular weight organic compounds containing basic groups such as proteins, polypeptides, bacteria, virus and enzymes, from solutions containing them, by the steps of bringing the solution into contact with a lignocellulosic material which has been sulphonated to such an extent that its ion exchange capacity reaches to at least 0.15 milliequivalents per gram, and separating the solution from the sulphonated lignocellulosic material.

4 Claims, 2 Drawing Figures

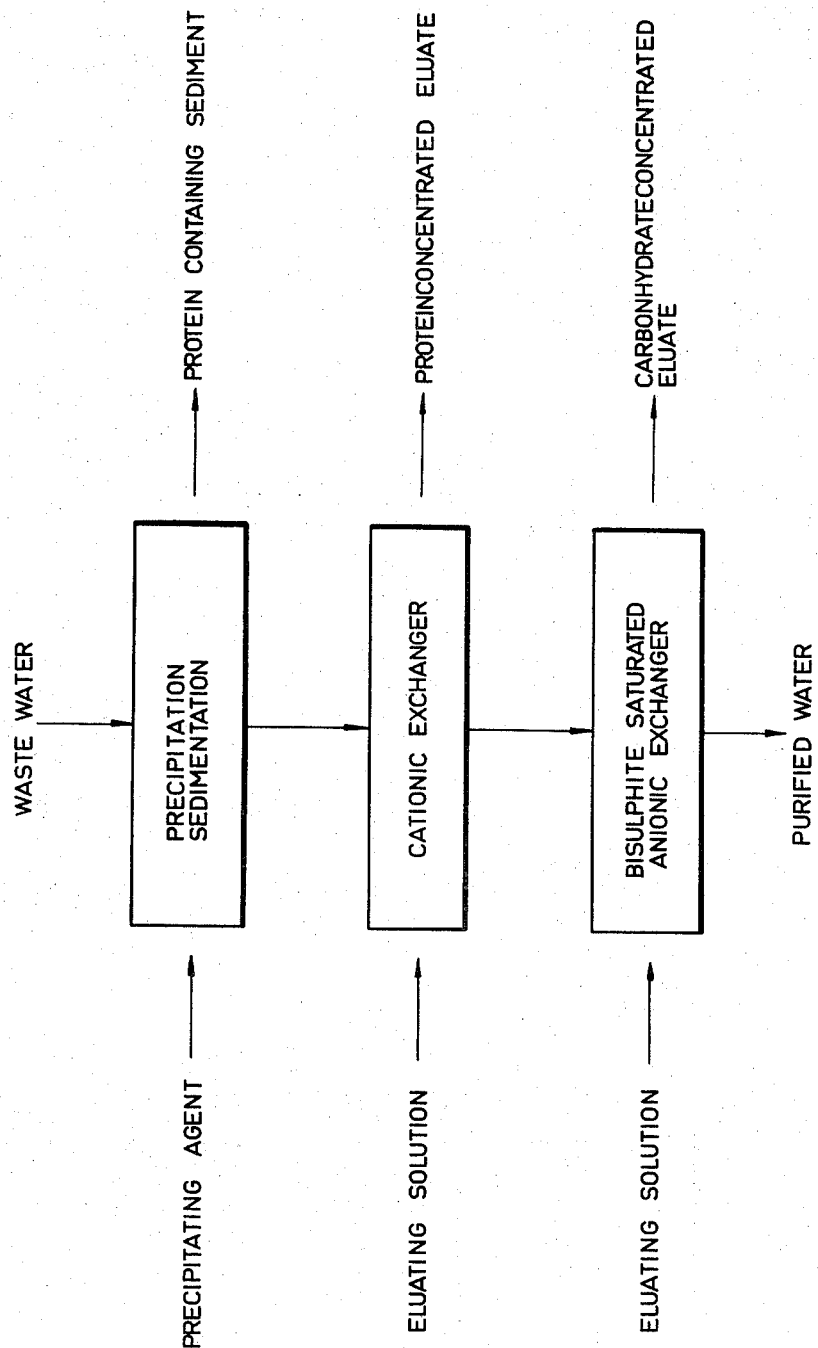

METHOD OF RECOVERING ORGANIC MATERIAL FROM AQUEOUS SOLUTIONS THEREOF

The present invention relates to a method of absorbing and optionally also of recovering high molecular organic substances from solutions thereof, particularly substances containing basic groups such as proteins, polypeptides, bacteria, virus and enzymes. In accordance with the invention there is used in this connection a material which is novel in the present context and which has been found to possess a surprisingly high ability to absorb the aforementioned organic substances from solutions thereof. Since one of the mechanisms effective in the absorption of the substances is assumed to be based on an ion exchange, a general description will first be given of ion exchanging methods.

During the last 10 years, ion exchange methods have become increasingly important within the separation technique, both for analysing purposes and for chemical technical processes on industrial scales.

The majority of ion exchange materials used in practice are fully synthetic and are constructed of three dimensional polymer networks, within which negative or positive groups are bound to the polymer molecule by covalent bonds. The polymer network may, for example, be cross-linked polystyrene. Negative groups include, for example, sulphonic acid groups or carboxyl groups, while positive groups include for example, amino groups or ammonium groups. These positive and negative groups have the ability of ionically binding to themselves negative and positive ions respectively. Material which contains negative groups, and which can thus bind positive ions, is called a cation exchanger, while material having positive groups and able to bind negative ions is called an anion exchanger. Such ion exchangers have mainly been used for absorbing low molecular ions, for example when softening water. They are distinguished by a high ion exchanging capacity and good chemical stability, but are relatively expensive. The major disadvantage with such synthetic ion exchangers is that in order to be sufficiently stable, the molecule network must be made so dense that high molecular ions are unable to penetrate the same and are absorbed by the material to only a very poor extent. Consequently, ion exchangers based on cellulose have been highly successful for absorbing high molecular ions.

A large number of methods are found described in the literature for introducing, by means of different reagents, suitable substituents into the cellulose molecule for the purpose of producing cellulose derivatives for ion exchange purposes. These relatively complicated and expensive methods will not be described in detail, although a number of examples will be given in brief.

Thus, it is previously known to use as an ion exchange substance carboxy methyl cellulose (CMC). This material is produced from alkali cellulose by treating the same with monochloroacetic acid. The obtained product may optionally be cross-linked by, for examplle, reacting the same with epichlorohydrine, to obtain a reduced degree of swellability in water. The material has been proposed for use when wishing to absorb proteins, for example, in the purification of insuline solutions. The major disadvantages with this ion exchanger is its relatively high manufacturing price, its low ion exchange capacity and the extent to which the material tends to swell in water. Another example of the use of cellulose derivatives as an ion exchanger includes the case in which diethyleneamino ethyl substituents are introduced into the cellulose molecule to provide an anion exchanger. It is disclosed in the literature that this ion exchanger can be used for isolating protein-containing material. The product, however, is very expensive.

Other products developed over the years for the purpose of providing ion exchangers useful for different purposes include condensation products of lignin and lignosulphonic acid. The condensation process has normally been effected with formaldehyd, monoamines and polyamines and phenols. Despite the efforts made on the basis of waste liquor from cellulose digestion processes and the lignin material contained therein to produce synthetic resins and ion exchange material (the magnitude of this line of research is made manifest by the large number of patents and publications issued on the subject) no process has yet been proposed which can be applied on an industrial scale.

The problem on which the present invention is based relates to the general efforts made in purifying industrial effluents to prevent contamination of waterways, rivers, lakes etc. and to recover valuable material present in such effluents. Examples of such material include proteins in effluents obtained, for example, from meat processing and fish industries.

A long applies method for isolating a part of the protein material present in such effluents resides in the precipitation of the material therefrom by means of certain precipitating agents, e.g. lignosulphonic acid. With one such method, precipitation of the protein material is effected by adding lignosulphonate to an acidified effluent, whereby a relatively large quantity of the highest molecular protein can be precipitated out. By using a relatively high molecular sulphonic acid, it has been possible in later years to precipitate out protein in meat processing effluents in such quantities that the biological oxygen demand (BOC) of the effluent has been reduced by 50–70%. Despite this, the BOC value is much higher than the value of normal domestic effluent and proposals have therefore been made to reduce the BOD value further by purifying the water by means of an ion exchange process in a subsequent step. Experiments have also been made in accordance herewith, a cellulose derivative — namely a cellulose partially esterified with sulphonic acid — having been used as an ion exchanger. Experiments have also been made with respect to purifying effluent in three steps, namely a first step comprising a precipitation process by means of organic sulphate esters, so-called glycosetrisulphate. The protein material is then separated by floatation or sedimentation. In a second step the solution from step one is subjected to a cation exchange process, whereupon polypeptides are isolated. The solution obtained from step 2 is then passed to a second ion exchanger step, where a bisulphite saturated anion exchanger is used to remove carbohydrates and certain negative ions. The tests were made with such ion exchangers as Amberlite XE 100, Amberlite 200, Whatman DE1, Amberlite IRA 68 and IRA 120 and cellulose sulphate. By means of the three step method it has been possible to reduce the BOC value of the effluent quite considerably, although not below 30, this being the limit set by most authorities on the BOD value of effluents to be released into rivers, lakes, etc. It has been established by tests that Whatman DE 1 (carboxymethyl cellulose) is the most effective cation exchanger, but since all the tested ion exchangers are highly expensive a cheaper ion exchanger must be produced if the method is to be applied industrially. This requirement is fulfilled by the ion exchanger pulp produced in accordance with the present invention.

As previously mentioned, the problem upon which the present invention is based has been created by the increased requirements for purified sewage effluent. A closer analysis, however, shows that the problem is also manifested in other connections, and has therefore a wider principle significance.

The basic problem thus resides in the general desire to remove from molecular or colloidal solutions of high molecular organic compounds containing basic groups at least a portion of these compounds and optionally to recover the compounds in a purer and/or more concentrated form. Examples of such compounds include proteins, polypeptides, bacteria, virus, enzymes and the like. Against the background of the present standpoint of techniques it has been obvious, however, that in order to solve this problem a sufficiently inexpensive material suitable for the purpose must be produced for absorbing the substances in question from solutions thereof. In accordance herewith experiments were carried out on the removal of certain compounds from solutions thereof using a lignocellulosic material which had been sulphonated to such an extent that the material obtained a sufficiently high cation exchange ability.

The novel and characteristic features of the present invention thus reside in the steps of contacting the aforementioned solutions with a lignocellulosic material which has been sulphonated to an extent such that its ion exchange capacity reaches to at least 0.15 mequ/g (milliequivalents per gram).

The term ion exchange capacity as used in the present application defines the content of ion exchanging groups determined according to a method in which the ion exchange material is first saturated with hydrogen ions and then titrated with alkali in the presence of a neutral salt. A description of the method is given below.

Two grams of ion exchanger sample are mixed in a cruicble with 50 ml 0.1 N HCl and stirred for 10 minutes. The sample is then filtered off and washed on a filter funnel with de-ionized water until the filtrate is neutral and free from chloride ions. The sample is then passed to a crucible containing 100 ml 1 N NaC1. The composition is then titrated while sirring with 0.1 N NaOH. The point of equivalence is determined potentiometrically. The ion exchange capacity is calculated by the formula $$J = 0.1 \cdot V/G$$

where
$J$ = the ion exchange capacity, mequ/g
$v$ = volume 0.1 N NaOH at the point of equivalence, ml
$G$ = weight of absolute dry pulp, g The ion exchange capacity as defined here thus discloses the ability of the substance to bind minute ions of the type $R^+$, $Na^+$ and the like. The capacity in respect of high molecular ions may be much lower, depending on the accessibility of the ion exchanging groups. When sulphonating lignocellulosic material, the sulphonic acid content of the material is initially increased, and then progressively decreased as the sulphonated lignin is dissolved out in the cooking liquor. The material thus obtains a maximum sulphonic acid content and therewith a maximum ion exchanging capacity, after a certain cooking time.

One example of the method for sulphonating lignin is the digestion of wood with sulphite, which is undoubtedly the simplest and least expensive method of producing the material of the present invention, and therefore to be preferred. Thus, it is particularly well established that the most important reaction in the conventional sulphite digestion process for producing pulp from wood or other lignocellulosic material is that the lignin is sulphonated by the bisulphite ions in the cooking liquor. It is this chemical process which enables the dissolution of the lignin for releasing the fibres. The lignin is made soluble in the cooking liquor by the sulphonisation process. This state is not reached, however, until the degree of sulphonisation is sufficient for the purpose.

There are several variations in the manner in which sulphite digestion process may be carried out and the invention is not restricted to any particular variant. The primary difference between the different sulphite digestion methods is the pH of the cooking liquor, namely an acid sulphite process (pH about 2), a bisulphite process (pH about 4) and a neutral sulphite process (pH about 7). The ion exchange capacity of the material cannot be solely attributed to the sulphonic acid groups, and a certain portion of this capacity, probably about 0.05 mequ/g, must be attributed to carboxyl groups, mainly bound to the hemicellulose. The maximum capacity capable of being obtained by sulphite digestion is thought to lie around 0.40 mequ/g. This is a low figure compared with synthetic ion exchangers, which normally have a capacity of several mequ/g. The sulphite pulp has therefore not been used in practice to any appreciable extent as an ion exchange material.

Subsequent to conceiving the idea of using sulphonated lignocellulose as a means for absorbing high molecular organic compounds, a number of tests were made to compare such a material with carboxy methyl cellulose. These tests are given below.

EXAMPLE 1

The lignocellulose material according to the present invention was produced by cooking pine in sodium bisulphite at a pH of approximately 4. The resulting pulp was removed from the digester at a chlorine number 23 with a yield of 70% calculated on the wood. The pulp was refined, washed, dried in air and ground in a mill to a relatively fine powder. The ion exchange capacity of the thus obtained material was determined at 0.27 milliequivalents per gram (mequ/g).

As comparison material there was used a commercially available carboxy methyl cellulose (Whatman CM 11) with a substitution degree of 0.10. The ion exchange capacity was determined to 0.50 milliequivalents per gram. The product existed in the form of a white powder.

A number of ion exchange towers or columns of conventional laboratory construction were each charged with 7 grams of the above material. The inner diameter of the ion exchange tube was 1.8 cm. The material was transferred to the ion exchange column in a conventional manner, i.e. the material was slurried in water and the suspension poured progressively into the ion exchange tube in a manner to form a homogeneous bed of ion exchange material.

The two ion exchangers were then saturated in the columns with hydrogen by passing 0.1 N hydrochloric acid to the beds, followed by de-ionized water, until the filtrate was free from chloride ions. The high molecular organic substance was not charged to the columns until this condition was reached.

Whey, i.e. the solution obtained as waste in the manufacture of cheese, was the substance used in the first test. The protein content of the whey sample used was established at 0.7%, by determining the nitrogen content and multiplying this by 6.25. The pH of the whey was 5.2.

The quantity of whey permitted to pass through the columns was sufficient to ensure that the protein could be shown qualitatively in the filtrate. It was found in both cases that no protein left the column until the liquid passed through the column exceeded by far the free volume of the column. This result clearly shows in itself that protein had been absorbed by the ion exchange material. In order to obtain more positive quantitative information concerning the quantity of protein absorbed by the material, the columns were washed with water, whereafter the ion exchange materials were removed, dried and analysed with respect to their nitrogen content. As above, the protein content was established by multiplying the nitrogen content by 6.25.

The results of the test are given in the following table:

|  | Ion exchange material | |
|---|---|---|
|  | According to the invention | Whatman CM 11 |
| Ion exchange capacity, mequ/g | 0.27 | 0.50 |
| bed volumn cm³/g | 9.7 | 9.2 |
| flow rate ml/min | 11.9 | 4.7 |
| nitrogen content[1]% | 0.73 | 0.26 |
| protein content % | 4.6 | 1.6 |

[1] Subsequent to subtracting the nitrogen content of the zero sample, which was 0.04 % for the material according to the invention and 0.02 % for Whatman CM 11.

As will be evident from the table, the material according to the invention not only afforded a higher flow rate than the Whatman CM 11, but also possessed a higher nitrogen content and a higher protein content calculated therefrom. This is particularly surprising, since the sulphonated lignocellulose material has a considerably lower ion exchange capacity than Whatman CM 11.

It is difficult to give a positive explanation as to why the material of the present invention possesses such a surprisingly high protein absorbing capacity. One possible explanation is that the sulphonic acid groups of the material are more readily accessible to the larger molecules than the carboxyl groups in the carboxmethyl cellulose.

There may, however, also be another explanation. If the nitrogen content is recalculated from percent based on the protein laden material to milliequivilents per gram based on the original material the following result is obtained:

| Ion exchange material | Nitrogen content milliequivalents per gram |
|---|---|
| according to the invention | 0.55 |
| Whatman CM 11 | 0.19 |

With respect to Whatman CM 11, the quantity of nitrogen absorbed, 0.19 milliequivalents per gram, is much lower than the ion exchange capacity, 0.50 milliequivalents per gram, while the reverse is true for the material of the present invention. This can mean that another mechanism, in addition to an ion exchange, plays a part in absorbing protein on the material according to the invention. It is probable that protein is precipitated in the neighbourhood of the strongly acid sulphonic acid groups in the material, caused by a locally very low pH.

It is conceivable that other mechanisms also play a part in this respect, and the invention should not be considered as being restricted to the ion exchange mechanism.

EXAMPLE 2

The absorption capacity of the pulp used in Example 1 was tested in respect of other protein-containing solutions than whey. In the case of skinned milk there was obtained a nitrogen content of 0.55%, corresponding to 3.4% protein, and with effluent water from cod treatment processes a nitrogen content of 0.33%, corresponding to 2.1% protein, was obtained.

EXAMPLE 3

Upon discovering that sulphonated lignocellulose gave the desired results, a new series of tests was made, in which six different sodium bi-sulphite pulps from pine were produced in varying yields and of varying ion exchange capacity. The digestion conditions and analysis data for the pulps were as follows:

One part by weight of pine chips was charged to an autoclave with 4.0 parts by weight sodium bi-sulphite cooking liquor. The cooking liquor contained 2.51% bound and 4.96% total $SO_2$ and had a pH of 4 at room temperature. The charge of bound $SO_2$ calculated on absolute dry wood, was 83 kg/ton.

The temperature pattern during the digestion process was as follows:

| Injection at 60°C | 0.10 h |
|---|---|
| 60–151°C | 2.30 h |
| at 151°C | varying, see the following table. |

| Time at max temp. Hours | Chlorine[1] number | Yield % | Pulp designation |
|---|---|---|---|
| 0.45 | 26.2 | 81.8 | A |
| 1.30 | 25.2 | 72.3 | B |
| 2.30 | 20.3 | 67.5 | C |
| 3.00 | 19.4 | 65.0 | D |
| 3.45 | 14.1 | 59.0 | E |
| 6.30 | 6.7 | 56.7 | F |

[1] From the Kappa number according to the relationship: Chlorine number = 0.2 × Kappa number. The pulps were refined, washed, dried and ground.

The method applied to determine the protein absorbing capacity of the pulps was principally the same as that described in Example 1. The whey had a protein content of 0.7% and a pH of 5.7. The results are given in the following table:

| Pulp | Chlorine No. | Yield % | Ion Exchange capacity mequ/g | Nitrogen content | | Protein content % |
|---|---|---|---|---|---|---|
|  |  |  |  | % | mequ/g |  |
| A | 26.2 | 81.8 | 0.30 | 0.47 | 0.35 | 2.9 |
| B | 25.2 | 72.3 | 0.31 | 0.63 | 0.47 | 3.9 |

Continued

| Pulp | Chlorine No. | Yield % | Ion Exchange capacity mequ/g | Nitrogen content % | Nitrogen content mequ/g | Protein content % |
| --- | --- | --- | --- | --- | --- | --- |
| C | 20.3 | 67.5 | 0.27 | 2.71 | 2.33 | 17.0 |
| D | 19.4 | 65.0 | 0.27 | 1.87 | 1.51 | 11.7 |
| E | 14.1 | 59.0 | 0.22 | 0.43 | 0.32 | 2.7 |
| F | 6.7 | 56.7 | 0.14 | 0.28 | 0.20 | 1.8 |

The results given in table 1 have been plotted in a graph illustrated in FIG. 1, where the protein content, %, and the ion exchange capacity, mequ/g, are given as a function of the yield of the pulps in percent.

The ion exchange capacity of the pulp passes through a relatively flat maximum. This is due to the fact that the lignin in the wood is sulphonated, although the ion exchange capacity rapidly rises as a result of the sulphonic acid groups. Lignosulphonic acid is dissolved out at the same time, however, which subsequently causes the ion exchange capacity of the pulps to decrease.

The curve illustrating the protein absorption capacity of the pulp is not parallel with the curve showing the ion exchange capacity. It is true that this curve also has a maximum, but this lies at a lower yield and is far more prominent than expected.

Thus, the test shows that a surprising effect is obtained owing to the fact that the protein absorption has a maximum within a specific critical yield region, corresponding to the capacity range of a specific chlorine number and ion exchange. Since a protein absorption capacity of moore than 2% must be considered an unexpectedly good result, it is obvious that the yield range of 57–90% is critical. If the demand with respect to protein absorption is increased to 4%, the range of 60–72% is extremely suitable and a very high protein absorption capacity, more than 10%, is obtained in the region of 65–70%.

In order to reach a protein absorption capacity of at least 2%, the ion exchange capacity should clearly be greater than 0.15 mequ/g. The best degree of absorption is obtained in the region of 0.20–0.31, preferably 0.25–0.30 mequ/g.

For the purpose of obtaining additional information for assessing the usefulness of the material according to the invention, a factory manufactured neutral sulphite pulp from birch was tested in the above described manner. The chlorine number was determined to 22.9. The yield was not known, but on the basis of the chlorine number was estimated to lie between 80 and 85%.

The ion exchange capacity was 0.20 mequ/g, i.e. lower than with the corresponding number and yield for the bi-sulphite pulp from pine. Subsequent to absorbing protein from whey, the nitrogen content was 0.40%, corresponding to a protein content of 2.5%.

EXAMPLE 4

Pulps and whey identical to those used in Example 3 were used in this test, but instead of transferring the pulps to a column, absorption of the protein was effected batchwise.

Approximately 5 grams of each sample were saturated with hydrogen ions by repeated slurrying 0.1 N HCl and washing with deionized water. Each of these samples was then slurried in 300 ml of whey. After 15 minutes the pulps were removed by filtration on a Buchner funnel and washed with de-ionized water until the washing water was perfectly clear (free from turbidity). The samples were then dried and analysed for their nitrogen content.

The following result was obtained:

| Pulp | Nitrogent Content % | Nitrogent Content mequ/g | Protein Content % |
| --- | --- | --- | --- |
| A | 0.28 | 0.20 | 1.8 |
| B | 0.41 | 0.30 | 2.6 |
| C | 0.51 | 0.37 | 3.2 |
| D | 0.54 | 0.40 | 3.4 |
| E | 0.46 | 0.34 | 2.9 |
| F | 0.25 | 0.18 | 0.25 |
| Neutral sulphite digested birch pulp | 0.15 | 0.12 | 0.9 |

This result shows that in a number of cases the absorption of protein is lower — in some cases much lower — with the batchwise tests than when absorbing the protein in a column. A maximum degree of absorption is also reached in this instance, however, namely with pulp D (chloride number 19.4.yield 65.0%, ion exchange capacity 0.27 mequ/g.)

The only explanation for the difference between the results obtained in Example 3 and Example 4 is that the protein absorption on the column bed of material within the optimal yield range is controlled by at least one mechanism in addition to an ion exchange.

A special method has been developed for purifying protein-containing effluent water obtained from, for example, food manufacturing processes. The process is in principal carried out according to the flow sheet illustrated in FIG. 2.

The development work has involved both tests carried out on a laboratory scale and tests carried out continuously in a pilot plant especially constructed for the purpose. The effluent water used in the tests was taken from meat processing plants and fish processing and treatment plants, since effluents from such industries contain a high content of protein. As will be seen from FIG. 2, it has consequently been necessary in the first step to precipitate out the larger portion of the higher molecular material by adding known agents, which material is obtained through sedimentation in the form of a protein rich sludge. The top solution or phase from this percipitating step, however, contains such large quantities of impurities that direct discharge into the waterways, lakes, rivers etc. is unsuitable. The problem has been solved at reasonable cost, however, by using in the second step of the process the absorption material produced in accordance with the invention. By periodically eluting the material using a suitable eluant, which is described in more detail below, a valuable eluate rich in protein is obtained. In a third stage of the process illustrated in FIG. 2, there is used a second ion exchanger e.g. an anion exchanger for recovering carbohydates present in the effluent.

EXAMPLE 5

The material used in these tests comprised a lignocellulose material produced from pine by means of the bi-sulphite process, with a chloride number of 20.5, corresponding to a yield of approximately 68%. The material was dried, ground, and screened through a screen having a mesh size of 0.20 mm. The ion exchange capacity was determined as being 0.25 mequ/g, using the above described method.

A number of effluent samples taken at different times from a meat processing plant was used during the tests. Analyses on the water samples showed that the consumption of permanganate was between 610 and 1030 mg/l and that the nitrogen contents were between 107 and 214 mg/l (six samples). In the case of the tests carried out on laboratory scale, the effluent water was first precipitated with a starch which had been esterified with sulphuric acid, so called glucotrisulphate. The precipitate was permitted to sediment and the clear top solution was decanted off. The thus produced samples had permanganate consumption values of between 220 and 440 mg/l and nitrogen contents of between 61 and 122/l.

In the case of the tests carried out in columns, the ion exchange material of the present invention was charged thereto by slurrying 5 grams of the material in water and then charging the slurry to the column. The effluent water was then introduced into the column and permitted to run out to a level slightly above the upper edge of the pulp bed, whereafter a further quantity of effluent water was charged. When determining the flow rate, a constant pressure height of 30 cm was maintained over the upper edge of the pulp bed.

Between each test, comprising an absorption step and an eluting step, the column was rinsed from beneath with water, followed by 0.5 NHCl.

The ingoing and outcoming effluent water samples were analysed with respect to their permanganate number, nitrogen content and dry goods content. In the initial tests, 1.5 l of water sample were passed through the column before the test was interrupted. The results from these tests are given in the following table:

| Ingoing water: | Permanganate consumption | = 440 mg/l |
| --- | --- | --- |
| | Nitrogen content | = 122 mg/l |
| | Dry goods content | = 1.98 g/l |
| | Biological oxygen consumption $BS_5$ | = 800 mg/l |
| | pH | = 4.0 |

| Total filtrate volume ml | Flow rate l/cm² hour | Permanganate consumption mg/l | Nitrogen content[1] mg/l |
| --- | --- | --- | --- |
| 200 | 0.32 | 280 | 94 |
| 400 | 0.32 | 280 | 94 |
| 600 | 0.35 | 280 | 94 |
| 800 | 0.36 | — | — |
| 1000 | 0.35 | 290 | — |
| 1200 | 0.36 | 300 | 98 |
| 1500 | 0.36 | 320 | 98 |

[1] The table values relate to the analysis of respective fractions. For the purpose of determining the dry goods content, all fractions were combined and the dry goods content was found to be 1.44 g/l.

As will be seen from the table, the through flow of liquid was substantially constant during the entire test. The permanganate number was greatly lowered initially by the through flow and rose only very slowly, and was still at a low level after 1.5 l had passed through the column, this level being far below that corresponding to the amount of ingoing water. The same is roughly true for the nitrogen content. The tests showed that approximately 40 mg of nitrogen and approx. 0.81 g dry goods were removed from the samples.

Comparison tests made with conventional, wholly synthetic ion exchangers of the type Amberlite IRA 120 gave considerably inferior results.

Thus, it is possible with the sulphonated lignocellulose material according to the invention to absorb substances which are difficult or impossible to isolate in other ways. More comprehensive tests have shown that it is possible in the precipitation stage to remove proteins of high molecular weight, higher than approx. 10,000, while the material according to the invention affords the advantage whereby proteins and polypeptides in molecular weight regions of 1,000–2,000 can be removed, which are otherwise difficult to isolate. Still lower molecular polypeptides can be removed with conventional wholly synthetic cation exchangers of the type Amberlite IRA 120.

EXAMPLE 6

When continuing the tests made on the effluent water taken from meat processing plants as described with reference to Example 5, different pH values were set on the water supplied to the second step, i.e. to the column containing the material produced in accordance with the invention. The result showed that the ability of the material to lower the permanganate value, dry content and nitrogen content was not affected by pH in the region 2–5, but fell slightly at pH 7 and markedly at pH 8, which would thus seem to constitute a critical value. The flow rate through the column was not affected to any appreciable extent by the pH of the ingoing solution. Since the first precipitating stage is effected to advantage at a pH of approx. 4, it is more to advantage from the technical aspect of the process to maintain this level of pH when the water passes in to the column used in the second step.

EXAMPLE 7

As a follow up to the tests made with respect to absorption of the mentioned compound in columns, elution of the pulp with different solvents was also applied. The results are given in the following table:

| Solvent | 50 ml solvent | | | 100 ml solvent | | |
| --- | --- | --- | --- | --- | --- | --- |
| | Effi-[2] ciency % | Nitrogen content mg/l | Dry[1] goods content g/l | Effi-[2] ciency % | Nitrogen content mg/l | Dry[1] goods content g/l |
| 10 % NaCl | 33 | 200 | 4.0 | 60 | 180 | 3.5 |
| 25 % H₂SO₄ | 25 | 150 | 3.1 | 50 | 150 | 3.1 |
| 1 % NaOH | 40 | 240 | 5.0 | 75 | 225 | 4.6 |
| 3.3 % NaOH | 55 | 330 | 6.5 | 90 | 270 | 5.5 |
| 3 % Na₂CO₃ | 50 | 300 | 6.1 | 88 | 264 | 5.7 |
| 3 % NH₃ | 45 | 270 | 5.5 | 78 | 235 | 4.9 |
| 4 % NaOH [3] | 85 | 1700 | 42 | 90 | 900 | 22 |

[1] The dry goods content of the solvent is not included.
[2] Efficiency = eluted quantity of nitrogen in % of quantity absorbed.
[3] From tests made on two columns in series. Elution of column No. 1

The nitrogen and dry goods content of the eluate will be seen from the table. The table also shows a magnitude of efficiency which discloses the eluted quantity of nitrogen in % of the total quantity of nitrogen in the column. The table illustrates the values obtained with 50 and 100 ml of solvent.

The tests show that a 10% NaCl and 25% $H_2SO_4$ provide a relatively good result, but that the best results are obtained with alkaline solutions.

EXAMPLE 8

Since the object of the tests has been to utilize the capacity of the cellulose ion exchanger to a maximum but, at the same time, to produce the lowest possible permanganate number on the outgoing filtrate, it was proposed to couple two columns in series. In this way, it would be possible to delay elution of the first column until the filtrate from the other column begins to show an unacceptable permanganate number. When this moment was reached the first column would be fully saturated and its capacity well utilized. Those tests made along these lines are reported in the following table:

| Ingoing water | Permanganate consumption | = 320 mg/l |
| | Nitrogen content | = 70 mg/l |

| Total filtrate volume ml | permangante consumption mg/l | |
| --- | --- | --- |
| | After col. 1 | After col. 2 |
| 500 | 150 | 148 |
| 1500 | 212 | 168 |
| 3000 | 232 | 194 |
| 40000 | 240 | 200 |
| 6000 | 236 | 216 |
| 7000 | 240 | 216 |
| 9000 | 232 | 208 |

These tests show that the permanganate number after column 2 does not reach the same value as after column 1 until a considerable quantity of water has been passed through the columns. Repeated tests with two columns in series and elution of column 1 gave an average result equal to that recited in the bottom lines of the table given with reference to Example 7.

As will be seen, this method provided a considerably improved efficiency and a higher nitrogen content and dry substance content of the eluate than the method using a single column.

EXAMPLE 9.

Since one and the same column was constantly used for the tests recited in examples 5–8, the different tests were in themselves a repeated process of absorption in and elution of the column. It was found, however, that the capacity of the column had not decreased with respect to lowering the permanganate number and nitrogen content, even though it had been subjected to 50 absorption and elution processes. Upon completion of the 52nd test, a sample of the pulp was taken from the column and analysed with respect to its nitrogen content. The nitrogen content of the sample was found to 0.04%, corresponding to 2 mg of the entire quantity of pulp in the column, i.e. 5 g. This illustrates the high efficiency of the sulphonated lignocellulosic material according to the invention and the favourable economic conditions which it provides.

EXAMPLE 10

To establish whether the physical form of the sulphonated lignocellulose had any effect on its absorption ability, the aforementioned dry ground pulp was compared with so-called granulated pulp. The granulated pulp was produced by dewatering the pulp washed after the sulphite digestion process to a dry content of approx. 50%, followed by mechanical shredding of the pulp, whereafter the pulp existed in the form of small granular-like fibre. For the purpose of comparison, pulps were used which had been dry ground in Korner Mills and Alpine Mills, both having a mesh diameter of 2 mm. During the tests carried out in the column, measurements were taken at a constant and relatively high pressure height, namely at a height of about 1.2 m above the lower defining surface of the pulp layer. The rate of flow through the bed of granulated pulp was 1.7 $l/cm^2.h$, while the rate of flow through the bed of dry ground pulp was approx. 0.01 $l/cm^2.h$. The granulated pulp thus showed a very high flow rate in relation to the ground pulp.

The protein absorbing capacity of granulated pulp was also tested in a manner similar to that recited in Example 3. The protein content after absorbing protein from whey was 10.9%, thus showing a very good result.

It is also possible by means of the method according to the present invention to isolate bacteria from solutions thereof by absorbing the bacteria on the sulphonated lignocellulose used in accordance with the method.

EXAMPLE 11

Effluent waste water from meat processing plants having a permanganate number of 800 mg/l and a B.O.C. value of 1460 mg/l was precipitated with 0.1 g/l glucose trisulphate. The precipitate was then permitted to sediment. The top solution was decantered off and was found to have a permanganate number of 320 mg/l and a B.O.C. value of 500 mg/l. Two liters of the solution were passed through a column bed having 5 g of sodium bisulphite pulp from pine (chlorine No. 20.5, yield 68%, ion exchange capacity 0.25 mequ/g.)

The outgoing water had a permanganate number of 200 mg/l and a B.O.C. value of 290 mg/l.

A bacteriological analysis of aqueous samples from the above described test gave the following result:

| Aqueous sample | Prior to precipitation | Subsequent to precipitation | Subsequent to passing through the column |
| --- | --- | --- | --- |
| Coli bacteria | enumerable | > 1000/100 ml | 0 |
| Aerobacteria genes | + | 0 | 0 |
| Salmonella | + | 0 | 0 |
| Fermentation on meat peptones 3 days at 21°C | enumerable | > 100/ml | 0 |

Enzymes can also be absorbed by the material produced in accordance with the invention, as will be evident from the following example.

EXAMPLE 12

100 grams of a pulp similar to that used in Example 11 were charged to a column having an inner diameter of 4 cm. The bed height of the column was 78 cm. The pump was saturated with hydrogen, whereupon the height of the bed fell to 74 cm. The volume of the bed was 9.3 cm$^3$/g.

A 0.4 % solution of cellulose in a 0.1 M sodium-acetate-acetic acid buffer at ph 4.5 was prepared and passed through the column. The effluent from the column was collected in 15 ml fractions by means of an automatic fraction collector. The enzyme activity in selected fractions was determined by measuring the viscosity of a 4% aqueous solution of sodium carboxy methyl cellulose as a function of time subsequent to adding 1 ml of the fraction. The results obtained show that the cellulose break through occurred at the volume interval 780–900 ml. Since the free volume of the column had been measured to 600 ml the conclusion can be drawn that the column material had absorbed enzymes. The material was removed from the column, washed and dried. The nitrogen content was 0.12%.

The test was repeated with a 0.4% enzyme solution which was not buffered but the pH of which was set at 4.5 with diluted hydrochloric acid. During this test enzyme break through did not occur until a level lying within the volume range of 1800–2160 ml was reached. A ninhydrine test gave a positive reaction on protein when 2040 ml had passed through the column.

What is claimed is:

1. A method of purifying a waste water containing a high molecular organic compound with a basic group of the group consisting of proteins, polypeptides, bacteria, virus and enzymes, which comprises bringing the waste water, at a pH less than approximately 8, into contact with a sulphite pulp resulting from sulphite digestion of lignocellulosic material which has been sulphonated to an extent such that its ion exchange capacity is at least 0.15 mequ/gr and thereafter separating the so-treated water from said material.

2. A method according to claim 1, wherein the sulphite pulp is formed into granule-like fiber agglomerates prior to being contacted with the waste water.

3. A method according to claim 1, wherein the waste water is caused to flow through a column containing said sulphite pulp.

4. In the purification of waste water containing proteinaceous material, a method comprising the combination of steps of treating the waste water in a first step with precipitating agents to remove from said liquid by precipitation and sedimentation the major part of the impurities contained therein, and in a second step bringing the thus partially cleansed water into contact with a sulphite pulp resulting from sulphite digestion of lignocellulosic material which has been sulphonated to an extent such that its ion exchange capacity of at least 0.15 mequ/gr, at a pH lower than 8, to remove residual proteinaceous material, such as residual proteins, polypeptides, bacteria, virus and enzymes, from said water.

* * * * *